Sept. 23, 1947. R. I. COLE 2,427,657
RADIO DIRECTION FINDING APPARATUS
Filed Sept. 30, 1942

INVENTOR.
Ralph I. Cole
BY William D. Hall
And S. S. Baker
ATTORNEYS

Patented Sept. 23, 1947

2,427,657

UNITED STATES PATENT OFFICE 2,427,657

RADIO DIRECTION FINDING APPARATUS

Ralph I. Cole, Long Branch, N. J.

Application September 30, 1942, Serial No. 460,211

7 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio direction finding apparatus and method and more particularly to the accurate and undistorted representation of received signals on a visual indicator. The radio direction finding apparatus is preferably of the type employing the principle of switching cardioids for the purpose of determining their respective signal intensities in relation to a particular source, a directional antenna and sense antenna being arranged to alternately operate in phase coincidence and phase opposition, producing thereby two distinct signals of a composite nature.

Various methods of switching the sense antenna for the purpose above noted have been used in the past. However, a serious defect in the use of these methods has been the effect of the switching operation upon the signal, distortion of the signal resulting therefrom. This may well be referred to as switching noise and in the visual type of indicator such as I preferably employ, the noise intensity of the mechanical switching operation is added to that of the signal being received so that the final indication is a sum of the signal-noise ratio. Thus, the locally performed distortion of the received signals results in an erroneous indication in the meter.

The present invention is therefore concerned with the provision of a reliable indication of the relative signal intensities in which the effects of switching noise are substantially eliminated. Indications of signal strength may be provided by various types of meters or other indicating means, such as dynamometers or cathode ray tube oscillographs.

Another object of my invention is to provide a cathode ray oscillograph in combination with a system such as above described, wherein the necessity of a sweep circuit oscillator is dispensed with and wherein the separation of the respective signals on the screen is effected by a fixed voltage applied to the horizontal deflection plates and switched in synchronism with the cardioid switching mechanism.

A further object of my invention is to provide a convenient method of comparing the relative intensities or signal strengths of signals which are alternately being composed and dissolved at a rapid rate and wherein their composition or dissolution, by switching, for example, is attended with the switching noise above referred to.

The invention is illustrated and explained in connection with the accompanying drawings, in which.

Figure 1:
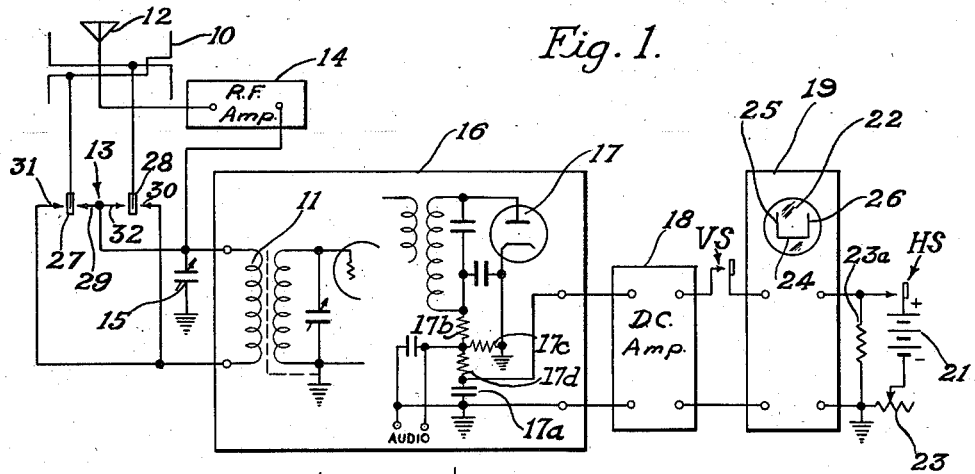
Figure 1 is a schematic circuit diagram of a preferred embodiment of the invention.

Referring to Figure 1, a directional antenna 10, having the figure of eight characteristic and illustrated as being of the Adcock type, serves to feed signals received thereby into the primary of input transformer 11. The omni-directional vertical antenna 12 is provided for determining the sense of the bearing given by the Adcock antenna 10. In order to periodically reverse the Adcock antenna 12 so that its output combines alternately in phase coincidence and phase opposition with the output of the vertical antenna 10, a switch 13 is provided. The schematic representation of Figure 1 indicates the contacts for effecting this switching operation. A radio frequency amplifier 14 is provided to amplify the non-directional signal and shift its phase 90° so that the phase combination above described can be properly effected and an Adcock compensator 15 serves to balance the capacities of the Adcock sections.

The secondary of the input transformer 11 communicates with the remainder of the receiver 16 in the usual manner and the combined signals of the vertical antenna 12 and the Adcock 10 are amplified and detected therein. The output voltage across condenser 17a is substantially D. C. and is generally used to produce automatic volume control by being fed back to previous stages. In the present construction, however, it is convenient to use this voltage for measuring the intensity of the signal received. Thus, although the invention is not limited to a particular type of receiver, a superheterodyne employing the usual A. V. C. voltage from the second detector is preferred.

Resistors 17b and 17c provide the usual load impedance while resistor 17d and condenser 17a comprise the A. V. C. filter system. The radio frequency and A. V. C. filter sections as well as the superheterodyne receiver and second detector circuit are conventional and any of the well-known types thereof may be employed.

This output voltage is accordingly fed into the D. C. amplifier 18, the output of which is then applied to the vertical plates of the cathode ray tube oscillograph 19. Suitable switching means, of which the purpose and construction will be hereinafter described, is designated as VS and this switch applies the rectified and amplified signal to the vertical plates of the cathode ray tube oscillograph 19. No sweep circuit is utilized for energizing the horizontal deflection plates of the oscillograph. In place thereof any source of D. C. voltage such as an ordinary B battery 21 whose voltage may be approximately 22.5 volts, is directly connected to, and furnishes a shifting potential for, the horizontal plates which serves to shift the vertical signal to the right of the oscillograph screen 22. The switch HS, as does the switch VS, serves to apply, as well as to cut off, the energizing voltage to the deflection plates of the oscillograph. While I have described the B battery 21 as supplying 22.5 volts, the actual voltage thereof may be increased or decreased for the purpose of laterally shifting the vertical image a desired amount along the horizontal axis of the oscillograph screen 22. In accordance therewith, a variable resistance 23 of any type may be provided in series with the battery 21. The high value resistor 23a serves to ground both horizontal plates without short-circuiting the battery 21. The particular oscillograph may employ horizontal and vertical deflection plates or other deflection means and the connections may be adapted to the design of the oscillograph.

Referring generally to the functions of the apparatus disclosed, it will be observed that the respective combined vertical and Adcock signals are measured by the length of the vertical lines 25 and 26 of the oscillograph screen 22. It will be apparent that each time the Adcock 10 is switched in respect to the vertical antenna 12, the amplification of this composite signal will produce a vertical trace upon the screen 22, whose length or amplitude will be a function of the intensity of the signal. If such switching of the antennae together with the operation of switch VS is accompanied by the operation of the switch HS, then the signals will be separated on the oscillograph screen 22 by a distance depending upon the voltage which has been applied to the horizontal deflection plates. This will repeat at the rate of the switching frequency and if a frequency of approximately 30 or more cycles is used, visual persistence will seemingly maintain the two signals on the screen simultaneously.

While the switch 13 is necessary to add first one side of the Adcock 10 and then the other, with the output of the vertical antenna system, its operation produces an electrical disturbance which is picked up by the receiver 16 and amplified together with the received signals. Obviously, this results in a locally performed distortion of the received signal and the trace on the screen 22 would be a misrepresentation or a spurious indication of the intensity of the signal which was picked up by the antennae.

I have devised means, therefore, of remedying this defect in the form of a mechanical switch that performs the following functions:

It effects the reversal of the Adcock 10 in respect to the vertical antenna 12 but immediately prior to each such switch, it cuts off the energizing voltage applied to the vertical deflection plates of the oscillograph 19 in such a manner that during the actual switching moment of the antenna switch, no signals can appear on the oscillograph screen 22. By this expedient the switching operation can have no effect upon the received signal as depicted on the screen 22.

Figure 2:
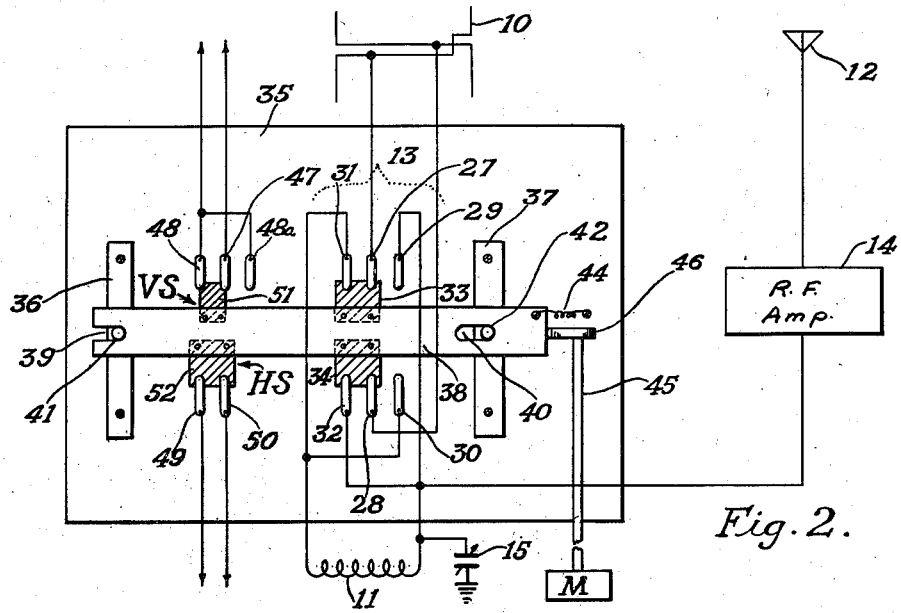
Figure 2 is a plan view of the mechanical switch used to effect the switching of the cardioids as well as to supply switching action for the vertical and horizontal deflection plates of a cathode ray oscillograph.

Referring to Figure 2, the particular switch employed includes the switch 13, which, as hereinabove stated, alternately reverses the Adcock 10 with respect to the vertical antenna 12. It will be noted that switch contacts 27 and 28 are connected to either side of the Adcock antenna. Switch contacts 29 and 30 feed the signal of the Adcock antenna to the primary of input transformer 11, while switch contacts 31 and 32 feed the same signal thereto but in the reverse direction. Conducting plates 33 and 34 serve to bridge the contact pairs and are arranged to slidably reciprocate between contacts 27, 29, and 28, 30 at one movement and between contacts 27, 31, and 28, 32 on the reciprocating movement. The switch mechanism may be disposed on a panel 35 having supporting bars 36 and 37 mounted thereon. Switch bar 38 of insulating material is arranged for slidable movement on the supporting bars 36 and 37. Slots 39 and 40 in cooperation with pins 41 and 42 serve to limit and define the movement of the switch bar 38. Any suitable means for effecting the reciprocation of the switch bar 38 may be utilized. In the present embodiment, I have illustrated the use of a motor M, to the shaft 45 of which, is secured the eccentric 46. The motor M may be of the synchronous type and may be arranged to operate from a 60 cycle line, for example, since under such conditions, persistence of vision will make the two traces appear to be simultaneously represented upon the screen 22. The eccentric 46, bearing against the switch bar 38, therefore urges said switch bar 38 to the other side of the panel 35 against the action of the spring 44.

The switching mechanism also controls the application of the potentials to the vertical and horizontal deflection plates. Switch contact 47, together with either of the contacts 48 or 48a, serves to energize the vertical plates, while contacts 49 and 50 are connected to the horizontal plates. Plate 51 is arranged to connect either contact 48 or 48a with contact 47, and since the width of the plate 51 is less than the distance between contacts 48 and 48a the circuit is open during a portion of the reciprocation of the plate 51. It is obvious, therefore, that no potential will be applied at that time to the vertical plates of the oscillograph. Plate 52 is arranged to reciprocate between on and off positions of the horizontal plate contacts and the width thereof is the same as that of the plates 33 and 34. Accordingly, the switch HS and the components of switch 13 will operate in synchronism. It is assumed, of course, that the distance between all the switch contacts are the same since making any bridge plate narrower is equivalent to increasing the distance between contact points. In the position shown in Figure 2, it is apparent that the plate 51 will open the vertical deflection plate circuit before the horizontal plate circuit is opened by plate 52 and before the antenna switch is effected. The opening of the vertical plate circuit will be followed by the simultaneous switching of the horizontal deflection plate circuit and the antenna system. Likewise, the horizontal and antenna switching operation will be completed before the vertical plate circuit has been re-established between the contacts 47 and 48a.

Referring now to Figure 1, it can be seen, therefore, that the sequence of operation will be as follows:

Before switch 13 reverses and transfers the energy of a side of the Adcock 10 to that of the vertical antenna 12, switch VS has opened the vertical circuit so that no vertical trace will appear on the oscillograph screen 22. After switch 13 has closed the circuit, however, switch VS will close the vertical circuit and a vertical trace will appear on the screen. The return of the switch bar 38 will reverse this action. The movements will then be repeated once in each cycle of the switching frequency.

My invention is practiced in the following manner:

The operation of taking a bearing is similar to that of any directional finder of the type under discussion. Each time that a side of the Adcock 10 establishes contact with the vertical antenna, a trace will appear on the oscillograph screen 22 providing that the vertical switch is closed. Assuming now that the signal is being amplified by the receiver 16 and the vertical switch has closed, a single trace will appear on the left side of the oscillograph screen, it being assumed that the switch HS is in the open position. Switch 13 will now effect the switching operation but the switching noise will have no effect upon the screen 22 because by that time switch VS has opened. When switch 13 closes the circuit, and switch HS, synchronized therewith, provides the base line 24, then switch VS closes, providing another vertical trace on the right side of the oscillograph screen 22 spaced from the first trace by a distance determined by the voltage applied by the battery 21 and by the characteristics of the oscillograph. Thus it will be obvious that no lateral trace other than the base line 24 can appear in the pattern derived from the signals. It is apparent also that due to the rapid rate of the switching frequency and persistence of vision, the vertical traces will appear to be simultaneously depicted on the screen 22.

Figures 3, 4:
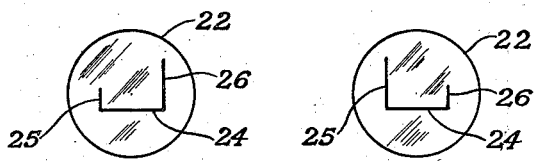
Figure 3 represents the pattern on the oscillograph screen when one signal is of greater intensity than the other.
Figure 4 represents a similar pattern with opposite intensities of the two signals.

When the vertical traces are of equal amplitude such as illustrated in Figure 1, signals of equal intensity from each cardioid are being received and an indication of the bearing, with, however, a 180° ambiguity, is achieved. In order to resolve this ambiguity, the Adcock is rotated in either direction, in order to ascertain the effect of this movement upon the amplitudes of the vertical traces 25 and 26. For example, the rotation of the Adcock in one direction should produce a pattern such as illustrated in Figure 3 and its rotation in the opposite direction should produce a pattern such as shown in Figure 4. Inasmuch as the vertical traces on the oscillograph screen 22 represent the signal intensity of each cardioid in respect to the source, it will be apparent to those skilled in the art that the rotation of the Adcock in one direction must increase the magnitude of one of the traces and decrease the other. Observation of which one of the traces is thus increased will provide an indication of the sense of the source transmitter, resolving thereby the 180° ambiguity. The connections may be made so as to adhere to usual practice. For example, if when the Adcock is rotated to the right from the bearing position, the right vertical trace increases, the bearing is a direct one. That is, the operator is facing the signal source. If the right trace decreases, a reciprocal bearing is indicated and the signal source is behind the operator.

The advantages of the patterns derived by the construction herein described are obvious in that a sharply defined differential representation of the signals are achieved on the oscillograph screen and the interruption of the application of the composite signals to the vertical plates during the antenna switching operations insures the vertical accuracy of the trace, undistorted by switching noise.

I claim:

1. A direction finding radio system comprising in combination, a directional antenna, an omnidirectional antenna, first switch means reciprocating at a rate to produce visual persistence on an oscillograph screen for combining the respective signal energies of said antennae in phase coincidence and phase opposition, a receiver for amplifying and rectifying said combined signal energies, an oscillograph having horizontal and vertical deflection means for indicating the comparative magnitudes of said combined signal energies, a source of constant voltage connected to the horizontal deflection means of said oscillograph, second switch means connecting said combined signal energies to the vertical deflection means of said oscillograph, and third switch means connecting said constant voltage to the horizontal deflection means of said oscillograph, said first, second, and third switches reciprocating continuously between off and on positions, said second switch operating to open the vertical deflection means circuit before each switch closing or opening operation of said first and third switches.

2. A direction finding radio system comprising in combination a directional antenna, an omnidirectional antenna, a receiver for amplifying signals derived from said antennae, an oscillograph having vertical deflection means for translating said signals into visual indications of amplitude and having horizontal deflection means for spacing signals on the screen of said oscillograph, a switch mechanism for switching the relationship of said antennae so as to combine the outputs thereof alternately in phase opposition and in phase coincidence, said switch mechanism being adapted to open and close the vertical and horizontal deflection means circuits of said oscillograph, and means on said switch mechanism to effect the opening of said vertical deflection means circuit before each switching of said antennae and the opening or closing of said horizontal deflection means circuit.

3. A system according to claim 2 including a common switch bar for performing said switching operations, switch contact bridging plates on said common switch bar, said vertical deflection means circuit comprising three spaced contacts disposed on said switch mechanism, the switch contact bridging plate of said vertical deflection means circuit reciprocating between the outer two of said three contacts so as to alternately bridge two adjacent contacts, the center contact functioning as a common terminal during each alternation, the space between said outer contacts being greater than the width of said bridging plate whereby said vertical deflection means circuit is open at one portion of the alternation, and means to correlate said opening of said vertical deflection plate circuit so as to effect said opening before each closing or opening of the horizontal deflection means circuit and the switching of the antenna system.

4. A directional radio system comprising, in combination, a pair of antennas, means to establish two circuits which respectively combine the energy in said antennas in different phase relation, control means to alternately block one circuit and establish the other circuit, an amplifier for amplifying the outputs of said circuits, indicator means controlled by said control means to separately indicate said outputs, a single output circuit from said amplifier to said indicating means, and means controlled by said control means to disable said output circuit for a period beginning before said one circuit is blocked and ending after said other circuit is established.

5. A direction-finding radio system comprising, in combination, a directional antenna, an omnidirectional antenna, means to establish two circuits which respectively combine the energy in said antennas in phase coincidence and phase opposition, control means to alternately block one circuit and establish the other circuit, a receiver for amplifying the outputs of said circuits, indicator means controlled by said control means to separately indicate said outputs, a single output circuit from said receiver to said indicating means, and means controlled by said control means to disable said output circuit for a period beginning before said one circuit is blocked and ending after said other circuit is established.

6. A directional radio system comprising, in combination, a pair of antennas, means to establish two circuits which respectively combine the energy in said antennas in different phase relation, control means to alternately block one circuit and establish the other circuit, a receiver for amplifying said outputs, indicator means controlled by said control means to separately indicate the amplitudes of the outputs of said circuits, said indicator means comprising a cathode-ray oscilloscope, a circuit controlled by said switch means to abruptly deflect said beam along one coordinate, a single output circuit from said receiver to said oscilloscope operating to deflect the beam along the other coordinate, and means controlled by said control means to disable said output circuit for a period beginning before said one circuit is blocked and ending after said other circuit is established.

7. A direction-finding radio system comprising, in combination, a directional antenna, an omnidirectional antenna, means to establish two circuits which respectively combine the energy in said antennas in phase coincidence and phase opposition, switch means to alternately block one circuit and establish the other circuit, a receiver for amplifying and detecting said signals, indicator means controlled by said switch means to separately indicate the amplitudes of the outputs of said circuits, said indicator means comprising a cathode-ray oscilloscope having horizontal and vertical deflecting means, a circuit controlled by said switch means to abruptly vary the potential of one of said deflecting means, a single output circuit for providing a signal of fixed phase from said receiver to the other of said deflecting means, and means controlled by said switch means to open said output circuit for a period beginning before said one circuit is blocked and ending after said other circuit is established.

RALPH I. COLE.

REFERENCES CITED

The following references are of record in the file of this patent:

FOREIGN PATENTS

| Number | Country | Date |
|---|---|---|
| 509,535 | Great Britain | July 18, 1939 |
| 108,204 | Australia | Aug. 7, 1939 |